United States Patent
Schröder

[11] 3,923,007
[45] Dec. 2, 1975

[54] EMERGENCY WATER-COOLING SYSTEM FOR A STEAM GENERATOR FOR A PRESSURIZED-WATER COOLANT NUCLEAR REACTOR

[75] Inventor: Heinz-Jürgen Schröder, Erlangen, Germany

[73] Assignee: Siemens Aktiengesellschaft, Munich, Germany

[22] Filed: Dec. 14, 1973

[21] Appl. No.: 424,652

[30] Foreign Application Priority Data
Dec. 19, 1972 Germany.................... 2262152

[52] U.S. Cl............................... 122/32; 122/407
[51] Int. Cl.............................................. F22b 1/06
[58] Field of Search......... 122/32, 33, 34, 483, 406, 122/407

[56] References Cited
UNITED STATES PATENTS

| | | |
|---|---|---|
| 2,845,906 | 8/1958 | Gram, Jr.................... 122/34 |
| 2,862,479 | 12/1958 | Blaser et al................. 122/34 |
| 3,202,584 | 8/1965 | Bogaardt et al............ 122/407 |
| 3,576,178 | 4/1971 | Zmola......................... 122/406 |
| 3,683,866 | 8/1972 | Zmola......................... 122/34 X |

*Primary Examiner*—Kenneth W. Sprague
*Attorney, Agent, or Firm*—Kenyon & Kenyon Reilly Carr & Chapin

[57] ABSTRACT

A steam generator for a pressurized-water coolant nuclear reactor has a housing with its lower portion closed by a horizontal tube sheet with an inverted U-shaped tube bundle extending upwardly within the housing and having inlet and outlet legs with ends mounted in the tube sheet, the latter having inlet and outlet manifolds below the tube sheet for the inlet and outlet legs of the tube bundle. The housing has a steam output outlet and a feed-water inlet to which feed-water is constantly supplied under pump pressure, and the manifolds are connected to a pressurized-water coolant nuclear reactor via a pipe line, a pump effecting circulation of the coolant with the latter flowing through the tube bundle. If the steam generator's feed-water supply fails for any reason, emergency measures must be taken quickly and this is done by a system for introducing cold water into the steam generator's housing to keep the tube bundle and tube sheet from dangerously overheating. To avoid severe thermal shock, particularly to the tube sheet and the adjacent portions of the tube legs mounted therein, this system introduces the cold water initially to parts within the steam generator's housing which are not so highly thermally stressed but which are hot and preheat the introduced emergency cold water to a temperature high enough so that when this water reaches the tube sheet and the portions of the tube bundle legs adjacent thereto, the emergency water has a high enough temperature to avoid causing dangerously high thermal shock on the part of the tube sheet and the adjacent tube bundle leg portions.

7 Claims, 5 Drawing Figures

EMERGENCY WATER-COOLING SYSTEM FOR A STEAM GENERATOR FOR A PRESSURIZED-WATER COOLANT NUCLEAR REACTOR

BACKGROUND OF THE INVENTION

A steam generator for a pressurized-water coolant nuclear reactor typically has a vertical substantially cylindrical housing with its lower portion closed by a tube sheet in which the inlet and outlet legs of an inverted U-shaped tube bundle are positioned, inlet and outlet manifolds below the tube sheet having connections with the nuclear reactor with a pump circulating the latter's pressurized-water coolant through the generator via the manifolds and tube bundle.

The generator's housing has a steam output outlet and a feed-water supply inlet to which feed-water is constantly supplied under pressure by a pump or pumping system as long as the feed-water supply meets the demand of the steam generating, the tube sheet and tube bundle being heated only to safe operating temperatures by the pressurized-water coolant flow. If the feed-water supply fails, such as might occur if the pump or pumping system fails, the continuous flow of pressurized-water coolant quickly brings the tube sheet and tube bundle to an unsafe and dangerous operating temperature, and emergency measures must then be taken to correct the situation.

One remedial measure is to quickly introduce cold water from an emergency water supply into the housing to keep its parts at a safe operating temperature until the feed-water supply trouble can be corrected. The portion of the tube sheet above the inlet manifold and the adjacent portions of the inlet tube bundle leg interfastened in this tube sheet portion, naturally operate normally at temperatures substantially higher than exists throughout the balance of the parts within the steam generator's housing. The introduction of the cold emergency water directly to these hottest portions of the parts within the steam generator housing causes these hottest portions to receive severe and dangerous thermal shocks such as might result in their destruction, wholly or partially, due to cracking and the like.

Therefore, a problem is presented in the way of in a reliable and reasonably inexpensive manner, providing an emergency water cooling system for such a steam generator, which will avoid the creation of such thermal shocks.

SUMMARY OF THE INVENTION

The object of the present invention is to provide a solution to the above problem.

According to the present invention the desired system is provided by an arrangement whereby the incoming emergency cold water, being introduced into the steam generator's housing in the event its feed-water supply fails, is first guided or caused to flow over extended areas of less hot parts within the housing prior to this water flowing to the previously-mentioned hottest parts within the housing. In this way the initially introduced cold water is preheated quickly and rapidly, without an excessive amount of parts, before the water reaches the hottest portions, the preheating being adequate to prevent such portions from being excessively or dangerously thermally shocked by the emergency cooling water.

Incidentally, the reason the normal flow of incoming feed-water required for the generation of steam does not introduce the problem of thermal shock, is because it is introduced to the generator's housing only adjacent to the portion of the tube sheet above the outlet manifold and the adjacent portions of the outlet leg of the tube bundle. In addition, this feed-water flow quickly intermixes with water descending in the descent space customarily formed by a cylindrical shroud which peripherally encloses the entire tube bundle and has open top and bottom ends, boiling water ascending within this shroud for subsequent descent down through the descent space thus formed, the descending water flowing into the initially introduced feed-water. This is the reason that the normal feed-water supply does not introduce the thermal shock problem.

According to this invention, there are various ways for achieving the above described fundamental concept. One is to introduce emergency cold water into the top of the generator's housing and to construct a vertically extending duct having one side formed by the previously mentioned shroud, with this duct extending to the bottom of the shroud so that the emergency water flow must contact the length of the shroud, which is, of course, hot, and be preheated before being released at the bottom of the shroud to the tube sheet and adjacent tube bundle leg portions. Preferably this duct has a plurality of openings along its length into which any residual amount of feed-water may flow and which remains after the feed-water supply fails. These openings may be designed in the fashion of venturis so that the flow of emergency cold water through the duct sucks in with it possibly remaining feed-water. In either case the duct may be formed by a plurality of end-to-end channel sections in the generator's descent space and with their flanges welded to the outside of the shield surrounding the tube bundle and with the inside of the generator's housing, forming the descent space.

The invention provides another way providing for use of the fundamental concept of this invention, this being by connecting the emergency water supply located at the top of the generator's housing to an annular manifold surrounding the top of the shroud and supplying the cold emergency water via suitable pipes to a plurality of nozzles, preferably of the spray type, inside of the shroud and peripherally surrounding the top of the tube bundle. In this case the cold water sprays first on top of the tube bundle, which is not so highly thermally stressed, and flows down through the bundle before reaching the tube sheet region.

A steam generator of the type described ordinarily has a steam-water separator mounted on top of the shroud and which is of the type providing a plurality of cyclone chambers into which the steam-water mixture rising from the shroud is injected in the typical manner so that by centrifugal action the water is thrown from the steam for return to the feed-water in the generator's descent space, the steam, of course, leaving the generator via its steam output outlet. Advantage is taken of this to project the cold emergency water into the separator with a pipe line going to each cyclone element and injecting the emergency cold water into the latter to centrifugal flow with a rotation counter or opposite to the normal rotative direction of the steam-water mixture discharging from the top of the shroud. This preheats the emergency water which then flows down through the descent space in the normal fashion for flow over the tube sheet and again upwardly through the tube bundle.

BRIEF DESCRIPTION OF THE DRAWINGS

Specific examples of the invention are illustrated entirely schematically by the accompanying drawings, in which.

DETAILED DESCRIPTION OF THE INVENTION

To simplify the above drawings, all of the familiar portions of a typical steam generator for a pressurized-water coolant nuclear reactor, which are not required for an understanding of the invention, are eliminated.

Figure 1:
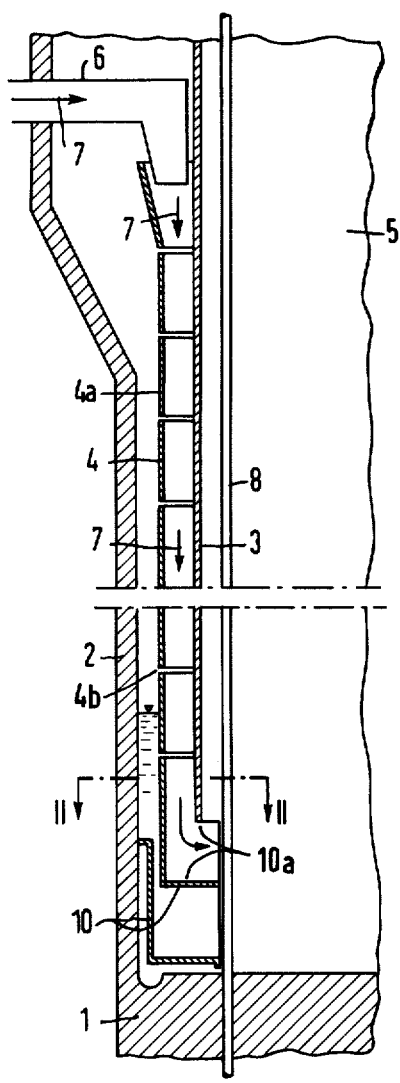
FIG. 1 in vertical section shows the portion of the steam generator required to illustrate the previously mentioned duct which extends down the length of the shroud forming the descent space and peripherally enclosing the tube bundle.
Figure 4:
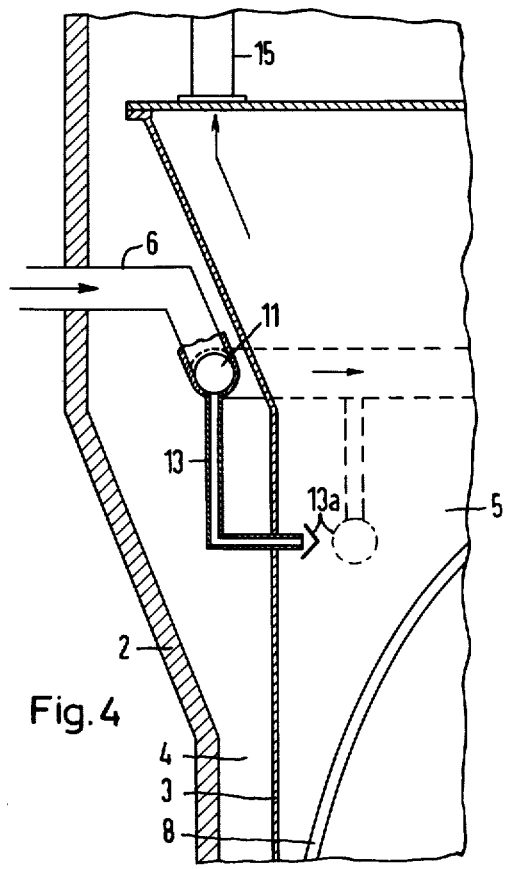
FIG. 4 in vertical section shows only the top of the steam generator embodying the form providing for injecting or spraying the cold water into the shroud at the top of the tube bundle.

With the above understanding, FIG. 1 shows the tube sheet 1 which closes the lower portion of the generator's housing 2, and the shroud 3, the outside of which cooperating with the inside of the housing 2, forms the annular area defining the descent space, the boiling space 5 being within the shroud 3. The upper portion of the housing 2 has the emergency cold water flow inlet 6 into which the emergency cold water is injected when trouble occurs, the arrows 7 indicating the flow. Only one of the tubes 8 of the inverted U-shaped tube bundle is shown, FIG. 4 showing the start of the semicircular bend of this tube 8 required as a return between the two legs of the tube bundle. The emergency water inlet 6 can be positioned at approximately the top level of the tube bundle as defined by its return portion.

Figures 2, 3:
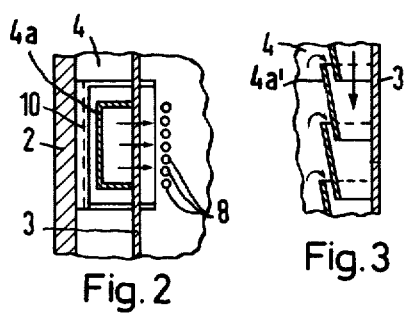
FIG. 2 is a horizontal cross section taken on the line II—II in FIG. 1.
FIG. 3 in vertical section shows a portion of the duct as it appears when constructed to provide the venturis.

Reference to FIG. 2 shows that the duct 4 is defined by channel sections 4a having their flanges welded to the outside of the shroud 3, the normal descent space providing adequate clearance. FIG. 2 also shows the row of individual tubes 8 of the tube bundle which are mounted in the tube sheet 1. These sections are interspaced slightly to form the openings 4b illustrated by FIG. 1. These spaces may be small, being preferably about the dimensions of the gauge of the metal from which the channel sections 4a are formed.

At the lower end of the duct 4 a horizontally directed spout 10 is formed which as shown by FIG. 2, is of larger dimensions than the duct 4 and has an open top down through which any residual feed-water may flow for horizontal discharge over the top of the tube sheet 1 and into the adjacent tube bundle leg. The bottom end of the duct 4 is also provided with a horizontally directed spout 10a having about the same dimensions as the balance of the duct 4. Any residual water can both flow into the duct through the spaces between its sections and downwardly for ejection horizontally from the spout 10, the supply of preheating emergency water being also able to flow out through the spaces between the various duct sections. It follows that a large volume of water can be introduced to the generator's housing while being adequately preheated so that when discharged via the spouts 10 and 10a it is at a safe temperature for contact with the tube sheet and the adjacent tube bundle legs.

In FIG. 3 the sections 4a' are defined as downwardly pointing venturis which through the spaces 4b forcibly suck in any residual water surrounding the duct 4.

In FIG. 4 the emergency water pipe 6 is shown as connected to the annular manifold 11 surrounding the top of the shroud 3 and via a plurality of pipes 13 feeding a plurality of nozzles 13a which point horizontally as a peripheral series inside of the shroud 3 and injecting the cold water over the top of the tubes 8 of the tube bundle. Preferably this is done via spray nozzles indicated at 13a so that widely dispersed sprays are introduced as contrasted to solid water streams.

Figure 5:
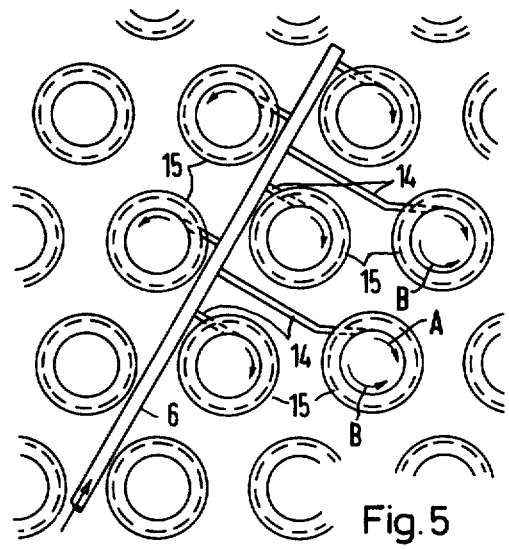
FIG. 5 in horizontal cross section illustrates a portion of the nest of cyclone elements as they can be provided with the emergency water cooling pipes injecting the cold emergency water into their chambers counter to the usual direction of the cyclone flow normally centrifugally separating the water from the steam.

FIG. 4 shows one of the cyclone elements 15 of the steam-water separator mounted on top of the shroud 3, while FIG. 5 shows a nest of these elements with the emergency cold water line 6 connecting via branch pipes 14 with each of the elements 15 tangentially so the cold water is injected in the direction of the arrows A, the normal cyclone direction being as indicated by the arrows B or counter to the rotation of the cold feed water injection.

What is claimed is:

1. A pressurized-water reactor steam generator comprising an upstanding housing having an inside and a lower portion and an upper portion, a tube sheet having a top and a bottom and closing said lower portion, inverted U-shaped tube bundle inside of said housing and having legs with lower ends mounted in said tube sheet via its top, said tube sheet having means for flowing reactor pressurized-water coolant via the tube sheet's bottom through said tube bundle, a shroud radially enclosing said tube bundle, said housing normally receiving a supply of feed water and said shroud being radially spaced from said housing to form a descent space inside of the housing, said shroud and tube bundle having upper portions and lower portions, and an emergency cold water inlet for said housing for introducing a flow of emergency cold water to said housing in the event said supply of feed water fails, said upper portions of said shroud and tube bundle normally operating at lower temperatures than their said lower portions and said tube sheet; wherein the improvement comprises said emergency cold water inlet being positioned in said upper portion of said housing and said generator having means for directing cold water flowing into said housing through said inlet, so that the cold water initially contacts substantially extended portions of at least one of said upper portions of said shroud and tube bundle before flowing into contact with said lower portions and said tube sheet.

2. The steam generator of claim 1 in which said shroud has an outside and a duct extends down said shroud's outside within said descent space, said duct having an upper end connected with said emergency cold water inlet and a lower end adjacent to said tube sheet.

3. The steam generator of claim 2 in which said duct is formed by sections having ends which are interspaced to open transversely into said descent space.

4. The steam generator of claim 2 in which a spout directed horizontally over the top of said tube sheet, is connected to the lower end of said duct.

5. The steam generator of claim 3 in which said sections' interspaced ends form downwardly pointing venturies.

6. The steam generator of claim 1 in which said means comprises an annular series of nozzles inside of said shroud and surrounding and pointing towards said upper portion of said tube bundle, and means for connecting said nozzles with said emergency cold water inlet.

7. The steam generator of claim 1 in which cyclone water separators are positioned in said housing above said tube bundle and said means comprises pipes connected with said emergency cold water inlet and with said separators to inject said water into said separators rotatively counter to the normal rotative operating directions of said separators.

* * * * *